May 7, 1957 W. C. EDDY 2,791,423

ENDLESS-TAPE MAGAZINE

Filed Sept. 14, 1954 2 Sheets-Sheet 1

INVENTOR.
WILLIAM C. EDDY
BY
Oems, McDougall, Williams & Hersh
ATTORNEYS

May 7, 1957 W. C. EDDY 2,791,423

ENDLESS-TAPE MAGAZINE

Filed Sept. 14, 1954 2 Sheets-Sheet 2

INVENTOR.
WILLIAM C. EDDY
BY
Oomp, McDougall, Williams & Hersh
ATTORNEYS 2,791,423

ENDLESS-TAPE MAGAZINE

William C. Eddy, Michigan City, Ind.

Application September 14, 1954, Serial No. 455,846

4 Claims. (Cl. 271—2.18)

Figure 1:
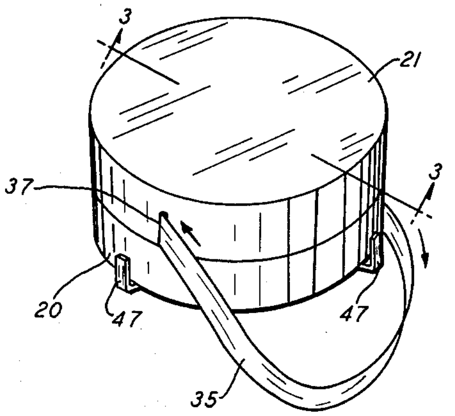

This invention relates to magazines for endless reels of tape or film; in particular, it is addressed to a novel magazine characterized by remarkable ease of assembly, low cost, and versatility in application.

Endless lengths of film or tape have come into extensive use in recent years. They have proved particularly useful in applications wherein a visual or audible presentation is to be repeated frequently, as with educational films, advertising sound tracks, etc. The endless construction eliminates the necessity for rewinding and thus makes repeated playing or exhibition much more convenient than when conventional double-ended tape or film is employed.

It will be understood by persons familiar with the art that the problems of storage and exhibition or playing are much the same with endless lengths of motion-picture film, on the one hand, and so-called "sound tape," on the other hand. With both types of material, the desired intelligence, be it picture or sound or both, is recorded on a long, thin ribbon. The most practical means of storing such ribbon is by coiling it on a reel. With both picture film and sound tape, exhibition or playing involves passing the ribbon longitudinally through a translating device such as a projector or the combined recording and playback apparatus commonly known as a "tape recorder."

For purposes of simplicity in presentation, the present specification will discuss the invention as applied to magnetic sound tape adapted for use with tape recorders. It will be understood, however, that, by simple modifications obvious to persons skilled in the art, the principles of the invention can be equally well applied in connection with motion-picture film.

Numerous types of magazines for housing endless lengths of tape may be found in the prior art, and many of such devices are functionally satisfactory. Generally speaking, however, the prior-art devices have been characterized by complex structure and numerous metal parts. Moreover, the prior-art designs have possessed little versatility. That is, a magazine designed for operation with a particular type of projector or tape recorder could not be successfully used with other types. As a result, while endless tapes have been very extensively used in commercial applications of various kinds, sale of pre-recorded endless tapes to the general public has never been economically feasible. It has, however, been widely recognized that, could the economic obstacles be overcome, endless tape would provide a far more satisfactory medium than grooved phonograph records for "packaging" and selling recorded intelligence to the public. Grooved records have far more severe limitations as to frequency range than does sound tape, and such records deteriorate rapidly with use, whereas sound tape, properly treated, can be used almost indefinitely without any detectable deterioration. The cost of tape and suitable magazines therefor, however, has been so great that tape has not, up to this time, offered grooved records any substantial competition, so far as the general public is concerned.

A major object of the present invention, therefore, is to provide a magazine for storage of endless tape that, while working well and possessing adequate mechanical strength, can be cheaply manufactured by molding, without the use of metal parts and without necessity for skilled assembly labor.

A further important object of the present invention is to provide inexpensive tape magazine from which tape may be successfully played on any of the wide variety of commercial tape recorders now on the market.

Specifically, a further object of the invention is to provide an inexpensive, molded-plastic tape magazine wherein the tape is securely protected against tampering by the public but which is provided with means whereby the user can himself, without risk of fouling the tape, adapt the magazine to permit its being used on either a left-hand or a right-hand playback instrument, at will.

To understand the importance of the last-mentioned object, it must be understood that conventional tape recorders are adapted to operate with double-ended tapes. Such machines normally wind the tape off of a storage reel, through a playback or recording head, and onto a second reel. On completion of the playing or recording operation, the tape is then wound back onto its storage reel. Some tape recorders pass the tape through the head from left to right, while others require that the tape be drawn through the head from right to left. Both types are in extensive use. Hence, it is highly advantageous to provide a pre-recorded endless-tape magazine which is adaptable to operation on either type of tape recorder.

As a result of the special advantages of my invention, a tape magazine made in accordance with it permits the marketing of pre-recorded endless tape at a price competitive with phonograph records. That, in the last analysis, is the ultimate objective of my invention.

In the appended drawing I have shown one illustrative embodiment of my invention; the detailed description which follows is addressed specifically to that embodiment, but it should be understood that it is merely exemplary.

Figure 2:
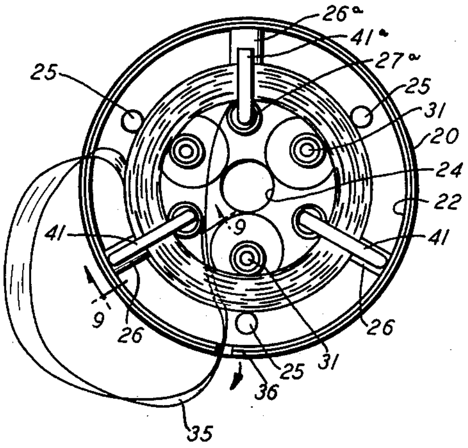
Figure 3:
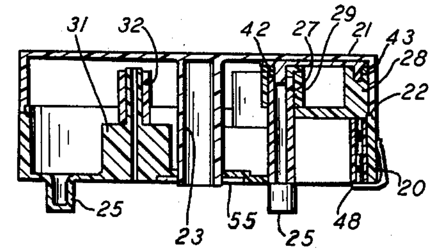
Figure 9:
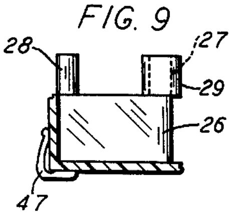
Figure 8:
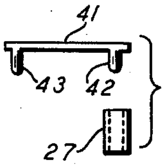
Figure 10:
Figure 11:
Figure 4:
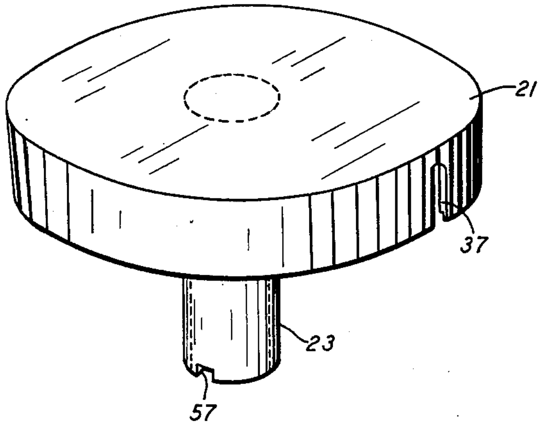
Figure 5:
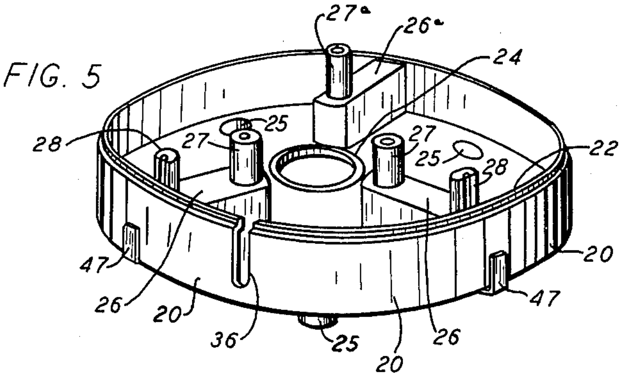
Figure 6:
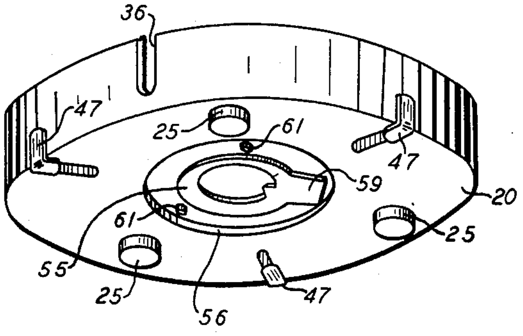
Figure 7:
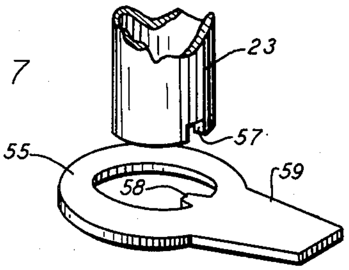

Fig. 1 is a perspective view showing one form of the invention as it appears when ready to be mounted on a tape-playback instrument. Fig. 2 is a plan view of the Fig. 1 magazine with the cover removed. Fig. 3 is a sectional view of the Fig. 1 magazine taken along the line 3—3 of Fig. 1. Figs. 4 and 5 together form what might be called an exploded view of the upper and lower molded members of the Fig. 1 embodiment, shown without any tape mounted therein to bring out the structural details. Fig. 6 is a perspective view of the bottom of the tape magazine, showing some of the structure by means of which the magazine can be adapted for either right-hand or left-hand playback instruments. Fig. 7 is a perspective fragmentary view showing the details of the keyed washer which holds together the top and bottom sections of the magazine housing. Figs. 8 and 9 are fragmentary views showing the details of one of the bridge members used to assist in holding the tape reel in position and the molded supports therefor; Fig. 9 is partially in section. Fig. 10 is a detail view of one of the plastic sleeves used to insure low bearing friction, and Fig. 11 is a detail view of a plastic insert which may optionally be employed to hold the external loop of the endless reel against the plastic housing and thus protect it from damage.

Referring now to the drawing, my tape magazine comprises a main housing member 20 and a top member 21. In the embodiment shown, both the body member 20 and the top 21 are formed in the shape of shallow cylinders.

Both of these housing components are preferably made of a suitable rugged plastic and are formed by molding.

As I shall bring out more clearly hereinafter, my entire tape magazine may be formed of plastic, and the assembly operation is simple and straightforward in the extreme.

Top member 21 has its rim provided with a small annular recess adapted to mate with a corresponding raised annular lip 22 on the rim of body member 20, the cooperative action of the recess and lip being to provide an overlapping fit between the body member 20 and the top member 21. Top member 21 is also provided with a molded-in central post 23. Post 23 may be hollow, as shown, although a solid construction may be used if desired. Cooperating with central post 23 is a central aperture 24 in body member 20, the diameter of aperture 24 being preferably a few thousandths of an inch greater than the post 23, in order that the parts will fit well but at the same time permit post 23 to turn readily within aperture 24.

Body member 20 is molded with a plurality of feet 25 projecting a short distance below the bottom surface of body member 20, to provide a moderate clearance below the under side of the body member when the magazine is resting on a flat surface.

Molded into the upper side of the body member 20 are three raised bosses 26, the function of which is to support the coil or reel of tape and to provide liberal clearance beneath the reel to permit passage out of the magazine of the exiting portion of the tape.

The bosses 26 are radially disposed and are symmetrically arranged around the circumference of body member 20, as best shown in Figs. 2 and 5. On two of the bosses 26 I provide upper extensions 27 and 28 at the respective inner and outer ends thereof. On the third boss, denoted 26*a* on the drawing, I provide only an inner extension 27*a*, the outer extension being omitted from that boss for reasons to be described hereinafter.

As shown in Fig. 2, the reel of tape in the assembled magazine rests on the bosses 26 and is centered by means of the inner extensions 27. To provide a minimum of bearing friction for the tape as it winds off of the inside of the reel and onto the outside thereof, I provide, on each of the extensions 27, a low-friction bearing sleeve 29. Sleeves 29 may be made of any suitable material; I have found nylon highly satisfactory.

In many applications, it will be found that the tape 35 will run smoothly with only three bearings, as provided by the sleeves 29 on the extensions 27. In some instances, however, additional bearings may be necessary to keep the reel turning smoothly without binding. For that purpose, I may therefore include a plurality of supplemental bearings carried on molded-in support members 31, as shown in Figs. 2 and 3. If such supplemental bearing members are used, each will normally be provided with a low-friction sleeve 32, generally similar in function and structure to the sleeves 29.

I have shown in Fig. 5 the appearance of my magazine when only the three basic bearings are used, the supplemental bearings 31 being omitted from the structure as shown in Fig. 5. For most applications I find the three extensions 27, with their low-friction sleeves 29, provide adequate support and bearing surface for the tape 35.

As shown in Figs. 1 and 2, the tape 35 comprises an endless reel, coiled within the magazine on bosses 26. One portion of the tape, leaving the innermost portion of the coil, passes below the main coil and leaves the magazine through a slot 36 provided in the body member 20 between the two upward extensions 28. The tape comprises an external loop as shown and returns to the magazine through a slot 37 in the side of the top member 21.

The tape 35 may or may not contain a mobius loop, as may be desired.

It will be understood that the actual length of the external loop will normally be considerably greater than shown in the drawing, since it must be sufficient to permit threading of the tape through the playing head of a tape recorder.

To hold the reel of tape 35 in proper position on the bosses 26, I provide three bridge members, of which two are designated 41 and the third is designated 41*a*. The bridge members 41 may be made of light plastic material and are supported on upward extensions 27 and 28 in the manner shown in Figs. 3, 8, and 9. Each of the members 41 is provided with a pair of downwardly extending projections or feet designated 42 and 43 respectively, foot 42 being adapted to fit into the hollow center of support 27 and foot 43 being similarly adapted to be received within the hollow interior of extension 28.

Bridge member 41*a*, being the one used in connection with boss 26*a* and upward extension 27*a*, differs from the other bridge members in that it has no outer foot 43.

If desired, clips 47 may be provided as a convenient means of holding the external loop of tape securing it safely against the casing or housing 20 during periods in which the tape is not being used. For convenient construction, the clips 47 may be made of a suitable flexible plastic and received within apertures 48 molded in the under side of body member 20. It will be understood that clips 47 may be omitted from the design if desired.

I have provided at the lower extremity of central post 23 of top member 21 means for securing thereto a keyed washer 55. Washer 55 may, if desired, be made of plastic material of suitable ruggedness.

Washer 55 is normally carried within a recess 56 molded into the bottom surface of body member 20, the depth of recess 56 being approximately the same as the thickness of washer 55.

Washer 55 may be affixed to the lower end of central post 23 in any desired manner effective to hold the two pieces locked securely together. In the embodiment shown, I have provided a notch 57 in the bottom face or edge of post 23 and have provided in the washer 55 a key 58 adapted to fit into notch 57, the central aperture of washer 55 being otherwise cut to form a snug fit with the outer diameter of post 23.

Washer 55 is provided along one side with a tab 59 projecting radially outward beyond the contour of the washer proper. In the embodiment shown, the simplest means of locking the washer 55 to the center post 23 after assembly of the magazine unit is by applying a suitable plastic solvent, such as polystyrene cement, to fuse together the plastic material of the center post and the washer. It will be understood, of course, that any other desired means may be used to accomplish the same result.

When the top member 21 is fitted to the body member 20, post 23 projects downwardly through central aperture 24 of body member 20, and when washer 55 has been suitably cemented or otherwise secured in place, top 21 is left free to rotate with respect to body member 20.

The limits of such rotation are fixed by a pair of pins 61 molded into the surface of recess 56. As top 21 is rotated relative to body member 20, the tab 59 of washer 55 will, at the desired limits of rotation, engage one of the pins 61. Pins 61 are disposed within recess 56 so as to afford the top 21 a range of rotation relative to body member 20 of approximately 180°—that is, through such an arc that the slot 37 is free to be moved through an arc of about 90° on either side of the boss 26*a*. (See Fig. 5.)

It will be seen that the returning portion of the tape 35, winding up on the outside of the reel carried on bosses 26, is free to rejoin the reel at any point through an arc of more than 200° without running afoul of any structural element. This freedom is provided by the special modification of boss 26*a* and bridge member 41*a* already described. (See Fig. 2.) Consequently, the cover or top member 21 may be oriented at the operator's will, merely by rotating the top with respect to the body member, so as to place slot 37 either approximately 90° to the left or approximately 90° to the right of slot 36. Thus the instrument can be used with equal convenience on either left-hand or right-hand tape recorders or playback instruments. As persons skilled in the art will understand, many modifications and changes in the specific embodiment herein disclosed can be made without departing from the principles of my invention as defined in the appended claims. It is therefore understood that the embodiment herein described is exemplary only.

I claim:

1. A magazine for carrying an endless reel of ribbon-like material comprising a shallow cup molded from plastic and having a plurality of bosses distributed around the bottom of said cup for supporting the reel of ribbon and holding the same clear of the cup bottom, means associated with said bosses for holding said reel substantially centered within said cup and providing low-friction bearing means for facilitating rotational movement of said ribbon on said bosses, said cup having a slot in its rim providing exit means for said ribbon, said cup also having a central aperture in its bottom, a cap member formed of molded plastic and adapted to fit over said cup to enclose the open portion thereof, said cap being provided with a slot in its rim to admit said ribbon and having also a central post molded integrally therewith and adapted to pass through said central aperture in the bottom of said cup when said cap is in registering engagement with the rim of said cup, means rigidly secured to the lower extremity of said post below the bottom of said cup operative to hold said cap in registering engagement with the rim of said cup while leaving the cap free to be rotated relative to said cup, and means for limiting the extent of such rotation to a predetermined arc.

2. Apparatus according to claim 1 wherein said holding means associated with the lower extremity of said post comprises a keyed washer of non-circular contour and wherein said rotation-limiting means comprises at least one stop member carried on the under side of said cup and disposed within the locus of rotation of said washer.

3. A magazine for carrying an endless reel of ribbon-like material comprising a shallow cup having a plurality of bosses distributed around its bottom surface for supporting the reel of ribbon and holding the same clear of the cup bottom, a bearing support carried on each of said bosses near its inner end, a low-friction bearing element carried by each of said bearing supports, said cup having a slot in its rim providing exit means for said ribbon, a cap member adapted to fit over said cup to enclose the open portion thereof, said cap being provided with a slot to admit said ribbon, means for holding said cap member in engagement with the rim of said cup operative to secure said cap against axial movement relative to said cup while leaving said cap and cup free to be rotated relative to one another, and means respectively carried by said cap and cup for limiting the range of such rotational movement to a predetermined arc.

4. A magazine for carrying an endless reel of ribbon-like material comprising a shallow cup having a plurality of bosses distributed around its bottom surface for supporting the reel of ribbon and holding the same clear of the cup bottom, a bearing support carried on each of said bosses near its inner end, a low-friction bearing element carried by each of said bearing supports, said cup having a slot in its rim providing exit means for said ribbon, a cap member adapted to fit over said cup to enclose the open portion thereof, said cap being provided with a slot to admit said ribbon, means for holding said cap member in engagement with the rim of said cup operative to secure said cap against axial movement relative to said cup while leaving said cap and cup free to be rotated relative to one another, and means respectively carried by said cap and cup for limiting the range of such rotational movement to a predetermined arc of more than 90° and less than 270°.

References Cited in the file of this patent

UNITED STATES PATENTS

| | | |
|---|---|---|
| 1,463,620 | Larsen et al. | July 31, 1923 |
| 2,327,108 | Heyer | Aug. 17, 1943 |
| 2,657,049 | Eddy | Oct. 27, 1953 |
| 2,699,332 | MacKenzie | Jan. 11, 1955 |